April 14, 1959    J. J. WATERS    2,881,480
METHOD OF MAKING CROWN AND LINER
Filed April 29, 1958

INVENTOR
JOSEPH J. WATERS

BY *Cushman, Darby & Cushman*
ATTORNEYS

United States Patent Office 2,881,480
Patented Apr. 14, 1959

2,881,480

METHOD OF MAKING CROWN AND LINER

Joseph J. Waters, Baltimore, Md., assignor to Crown Cork & Seal Company, Inc., Philadelphia, Pa., a corporation of New York Application April 29, 1958, Serial No. 731,703

1 Claim. (Cl. 18—59)

This invention relates to the preparation of polyethylene liners for crown closures.

It has previously been proposed, e.g., Dorough Patent No. 2,238,681, to prepare polyethylene liners for crown closures. However, difficulties are encountered in insuring the formation of a symmetric liner. Thus, if the polyethylene is flowed in in the molten condition or dissolved in a solvent, it is extremely difficult to make a uniform liner. Similarly, if the polyethylene is placed in the crown in the form of a disc and then molded, there is a serious problem of accurately centering the disc.

Accordingly, it is an object of the present invention to devise a procedure for making polyethylene liners which are symmetrical.

Another object is to insure accurate centering of solid polyethylene in a crown closure.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by inserting into the crown closure a square of solid polyethylene having a diagonal dimension substantially equal to the diameter of the bottom of the crown closure and thereafter molding the polyethylene into an overall symmetrical liner with the aid of heat and pressure. Since the square of polyethylene is circumscribed by the walls of the crown closure, it is automatically centered and uniform liners can thus be molded quickly and efficiently.

Figure 1:
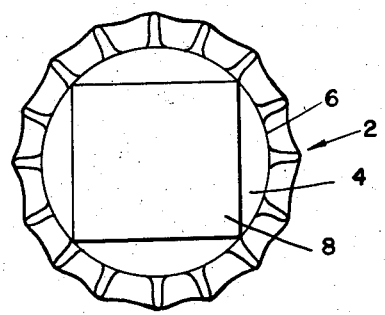
Figure 1 is a bottom view of a crown cup having a square of polyethylene therein.
Figure 2:
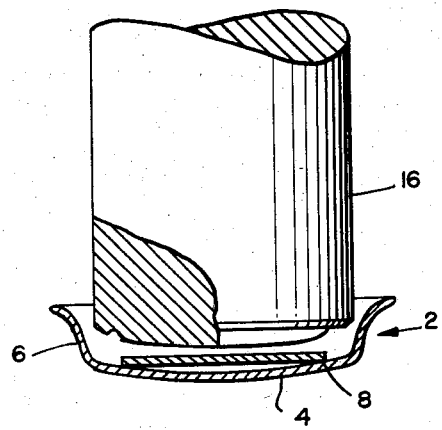
Figure 2 is a vertical section showing the application of a molding plunger to the square of polyethylene.
Figure 3:
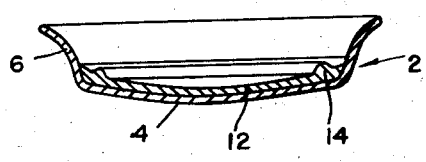
Figure 3 is a vertical section of the crown closure and molded liner.

Referring more specifically to the drawings, there is provided a crown closure shell 2 having a bottom wall 4 and inside wall 6. A shearing plunger (not shown) shears a polyethylene square 8 from a ribbon of polyethylene and deposits it in the closure shell. Since the square 8 is of substantially the same diameter as the diameter of the bottom wall 4, it has little freedom of movement and is centrally disposed. After the square of polyethylene is inserted into the closure, forming plunger 16 is pressed against the polyethylene to form overall polyethylene liner 12. As shown in the drawings, a two-step plunger is employed to give a raised sealing bead 14. However, there can also be used a one-step plunger which does not form such a bead but instead forms a liner of identical thickness throughout.

Either the plunger or cap or both are heated sufficiently to soften the polyethylene so that it can be molded. Usually this is a temperature of 95 to 125° C. In a specific example utilizing polyethylene of moleculer weight 12,000, the plunger was heated to 110° C. in order to form the overall liner from the square of polyethylene.

There can be employed solid polyethylenes of molecular weight 7,000 to 35,000 or even higher. The polyethylene can be made by conventional high pressure processes or by low pressure processes, e.g., the Ziegler and Phillips methods. Similarly, the polyethylene can be of low, medium or high density. Likewise, cross-linked polyethylenes can be used, such as irradiated polyethylene and peroxide cross-linked polyethylene.

I claim:

A method of forming a polyethylene liner for a crown closure shell comprising inserting into the crown closure a square of solid polyethylene having a diagonal dimension substantially equal to the diameter of the bottom of the crown closure whereby the square of polyethylene is circumscribed by the inside wall of the crown closure and has little freedom of movement and then molding the square into an overall symmetrical liner with the aid of heat and pressure.

References Cited in the file of this patent

UNITED STATES PATENTS

| | | |
|---|---|---|
| 1,486,937 | Taliaferro | Mar. 18, 1924 |
| 2,238,681 | Dorough | Apr. 15, 1941 |
| 2,395,295 | Rowland | Feb. 19, 1946 |